J. C. Pfeil,
Plow Coulter,
Nº 76,343. Patented Apr. 7, 1868.
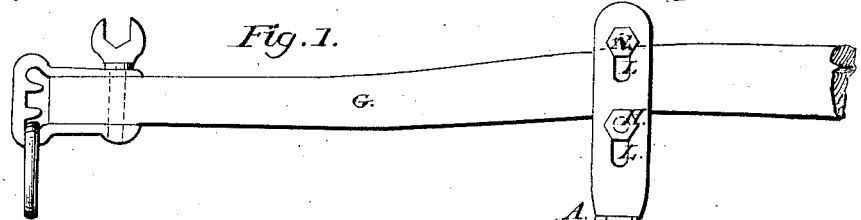
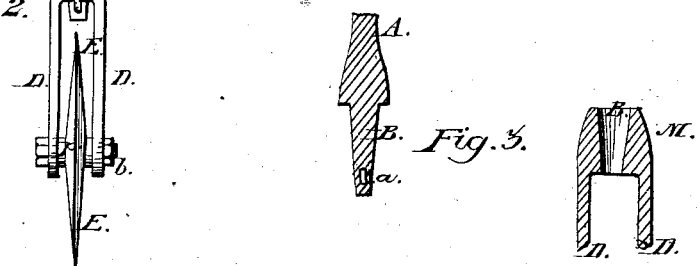
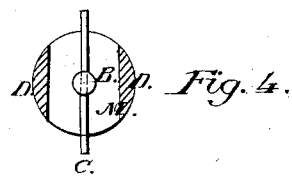
WITNESSES:
Ruth K. Abbott
J. P. Webster
INVENTOR:
John C. Pfeil
by J. b. Abbott
Attorney

United States Patent Office.

JOHN C. PFEIL, OF ARGENZVILLE, ILLINOIS.

Letters Patent No. 76,343, dated April 7, 1868

IMPROVEMENT IN ROTARY CUTTERS FOR PLOUGHS.

The Schedule referred to in these Letters Patent and making part of the same.

TO ALL WHOM IT MAY CONCERN:

Be it known that I, JOHN C. PFEIL, of Argenzville, in the county of Cass, and State of Illinois, have invented new and useful Improvements in Rotary Cutters for Ploughs; and I do hereby declare that the following is a full, clear, and exact description of my invention, reference being had to the accompanying drawings, and to the letters of reference marked thereon, of which drawings—

Figure 1 is a side view of my improved rotary cutter.

Figure 2 is an end view of the same.

Figures 3 are sectional views of the caster-spindle and collar, and

Figure 4 is a plan of caster-joints, showing the arrangement of pin.

The nature of my invention consists in providing the arm which carries the cutter with a swivel or caster-joint, also in the peculiar arrangement of slots in the cutter-arm, in such a manner as to allow of the rotary cutter being raised or lowered at pleasure, by which improvements I greatly increase the utility of this species of cutter, especially when used in connection with gang or sulky-ploughs, where an ordinary straight cutter, or a rotary cutter which has no horizontal motion, is found very objectionable.

To enable others skilled in the art to make and use my invention, I will proceed to describe its construction and operation.

G is the plough-beam, of the common form, A is the cutter-arm, and E is the rotary cutter. The cutter-arm A is flat at its upper part, and has the slots, L L, therein, through which pass the bolts H H, one above and the other below the plough-beam G, thence through the plate-iron K, on the other side of said beam, where they are secured by nuts J J, as shown. It is readily seen that when the nuts J J are screwed up tight, the plates K and cutter-arm A will be firmly secured to the beam, and also, that by loosening the nuts J J, the arm A may be raised or lowered, as desired, the bolts H H sliding up or down in the slots L L. On the lower part of the arm A is arranged the tapering spindle B, as shown, which passes through a corresponding tapering hole, B, in the collar M, to which are secured the arms D D, which guide the cutter E. A bolt, F, passes through the arms D D and the cutter E, and is secured by the nut $b$, thus serving as the axis for said cutter. A pin, C, of the form shown, or any other suitable form, is arranged in a hole, $a$, in the lower end of the spindle B, and extends out beyond the collar M, thus serving at the same time to prevent the collar M from coming off the spindle B, and to prevent the cutter from turning around too far, so as to get the arms D D in a direction opposite from their correct position, shown in drawings, as, when the cutter has turned around the spindle B a sufficient distance, the arms D D strike the pin C, and any further rotation in that direction is prevented. This arrangement is fully shown in fig. 4.

The tapering spindle B, used in connection with the tapering hole B, in the collar M, insures a good-fitting joint at all times, for as the hole B wears out, the top of the collar M wears off, and allows the collar M to move up on the spindle B, and thus any looseness of the joint is prevented.

With the cutter thus arranged, it can be made to cut to a greater or less depth, and the plough can be lifted up out of the ground, or turned in any direction, without cramping the cutter or getting it wrong-side foremost, which is very objectionable, as, when the cutter is turned in the wrong direction, and the plough drawn ahead, the cutter will turn around, and in this turning is very liable to be broken.

Having thus fully described my improved cutter, I wish it understood that I do not claim as my invention the principle of making a cutter capable of adjustment to a greater or less cut, nor the use of the rotary wheel-cutter, nor the principle of giving the cutter a horizontal or caster motion, as all these ideas have been before shown; but

What I do claim as my invention, and desire to secure by Letters Patent, is—

1. The peculiar arrangement and combination of the spindle B on cutter-arm A, and collar M with hole B therein, for the purpose of forming a caster-joint for cutter E, substantially in the manner and for the purpose herein specified.

2. The slots L L in the cutter-arm A, whether said arm be for a rotary or any other kind of cutter, where said slots are used to allow of vertical adjustments of said cutter, substantially in the manner and for the purpose herein specified.

3. The pin C, when said pin serves both to secure the collar M on the spindle A, and to limit the rotary or caster motion of the cutter E, in the manner and for the purpose herein specified.

As evidence that I claim the foregoing, I have hereunto set my hand in presence of two witnesses.

JOHN C. PFEIL.

Witnesses:
 THOS. H. GLEESON,
 F. G. FARRELL.